US009769685B1

(12) United States Patent
Gaudutis et al.

(10) Patent No.: US 9,769,685 B1
(45) Date of Patent: Sep. 19, 2017

(54) LONG TERM EVOLUTION (LTE) NETWORK MANAGEMENT SYSTEM TO PROCESS AND DISPLAY INTERNET PROTOCOL USAGE DATA

(71) Applicant: Sprint Communications Company L.P., Overland Park, KS (US)

(72) Inventors: Joseph E. Gaudutis, Lee's Summit, MO (US); Damon Edward Dowdall, Leesburg, VA (US); Michael Francis Fiumano, McLean, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 224 days.

(21) Appl. No.: 14/231,925

(22) Filed: Apr. 1, 2014

(51) Int. Cl.
*H04W 24/08* (2009.01)
*H04L 12/26* (2006.01)

(52) U.S. Cl.
CPC ........... *H04W 24/08* (2013.01); *H04L 43/045* (2013.01)

(58) Field of Classification Search
CPC .... H04W 24/00–24/10; H04W 76/00–76/068; H04L 65/00–65/80
See application file for complete search history.

(56) References Cited

U.S. PATENT DOCUMENTS

| 7,715,381 | B2 | 5/2010 | Shen | |
| 8,094,659 | B1 * | 1/2012 | Arad | H04L 45/586 370/392 |
| 8,451,833 | B2 | 5/2013 | Kolli et al. | |
| 8,472,451 | B2 | 6/2013 | Shen | |
| 8,488,491 | B2 | 7/2013 | Moreno et al. | |
| 2009/0296714 | A1 * | 12/2009 | Gerber | H04L 12/4641 370/395.31 |
| 2010/0093284 | A1 * | 4/2010 | Terrero Diaz-Chiron | H04W 24/10 455/67.11 |
| 2014/0171089 | A1 * | 6/2014 | Janakiraman | H04L 63/0892 455/445 |
| 2014/0293824 | A1 * | 10/2014 | Castro Castro | H04L 41/142 370/252 |

FOREIGN PATENT DOCUMENTS

| ES | WO 2013071958 A1 * | 5/2013 | ........... H04L 41/142 |

* cited by examiner

*Primary Examiner* — Lakeram Jangbahadur

(57) ABSTRACT

A Long Term Evolution (LTE) network management system processes and displays Internet Protocol (IP) usage data between LTE network elements. A routing system exchanges IP packets between the LTE network elements using Virtual Routing and Forwarding (VRF) modules. The routing system generates usage data associating individual ones on the VRF modules with amounts of IP packets exchanged between the LTE network elements. A network control system processes the usage data to determine the amounts of the IP packets exchanged between the LTE network elements for each of the individual VRF modules. The network control system graphically displays the amounts of IP packets exchanged between the LTE network elements for each of the individual VRF modules.

20 Claims, 8 Drawing Sheets

LONG TERM EVOLUTION (LTE) NETWORK MANAGEMENT SYSTEM TO PROCESS AND DISPLAY INTERNET PROTOCOL USAGE DATA

TECHNICAL BACKGROUND

Long Term Evolution (LTE) communication networks have various network elements to provide wireless communication services to User Equipment (UE). Some examples of LTE network elements include: Mobility Management Entity (MME), PDN Gateway (P-GW), Service Gateway (S-GW), IP Multimedia Subsystem (IMS), Wireless Fidelity Gateway (WIFI GW), 2G/3G Gateway, Home Subscriber Server (HSS), Policy and Charging Rules Function (PCRF), Media Server, and eNodeB. The LTE network elements are coupled by Internet Protocol (IP) links. The IP links are defined by the IP addresses of the LTE network elements at each end. IP routers between the LTE network elements route IP packets using these IP links.

The IP routers use routing tables to route IP packets based on their IP addresses. In some cases, the IP routers are logically partitioned into Virtual Routing and Forwarding (VRF) instances. Each VRF instance has its own routing table and remains independent of the other VRFs. Separate VRFs may even handle the same IP address differently. In LTE networks, separate VRFs are often established for different wireless services. For example, there could be a VRF for prepaid Internet access and another VRF for Voice over LTE (VoLTE) services.

Unfortunately, the IP routers in an LTE network do not provide adequate data to associate the VRFs with other IP data. This situation is exacerbated by the fact that VRFs may share the same IP addresses. Current techniques for modeling IP links in an LTE network on a VRF basis are not efficient or effective.

Overview

A Long Term Evolution (LTE) network management system processes and displays Internet Protocol (IP) usage data between LTE network elements. A routing system exchanges IP packets between the LTE network elements using Virtual Routing and Forwarding (VRF) instances. The routing system generates usage data associating individual ones on the VRF instances with amounts of IP packets exchanged between the LTE network elements. A network control system processes the usage data to determine the amounts of the IP packets exchanged between the LTE network elements for each of the individual VRF instances. The network control system graphically displays the amounts of IP packets exchanged between the LTE network elements for each of the individual VRF instances.

DETAILED DESCRIPTION

Figure 1:
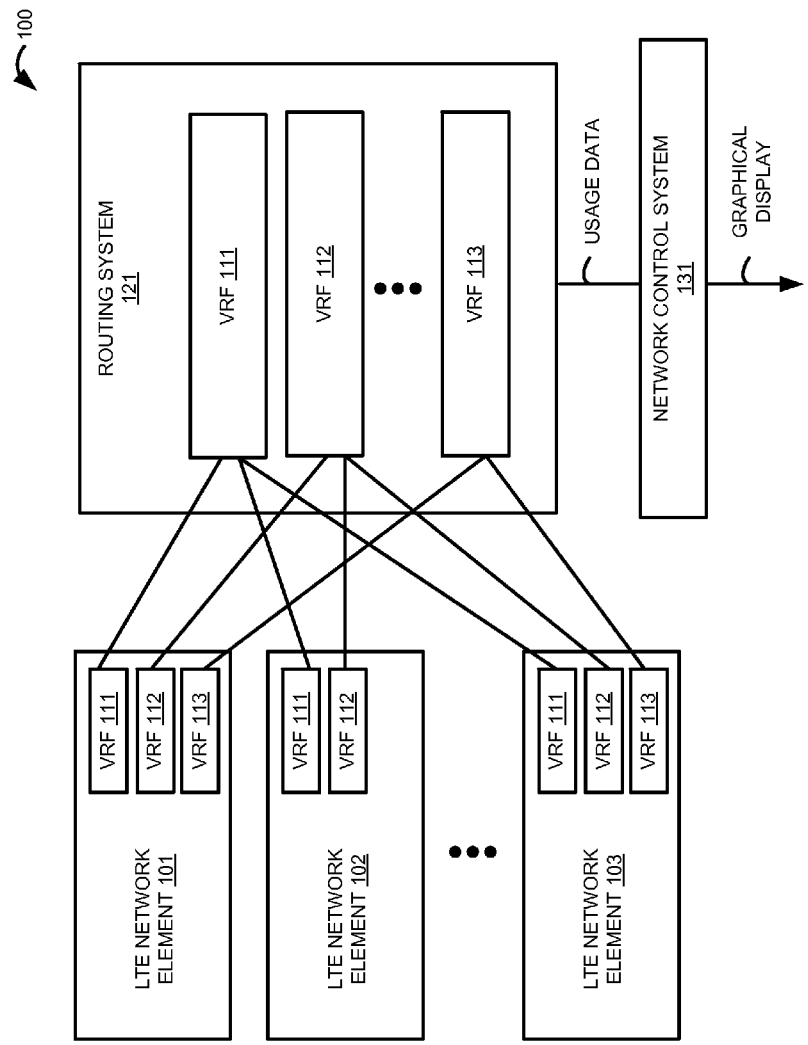
FIG. 1 illustrates a Long Term Evolution (LTE) network management system to process and display Internet Protocol (IP) usage data between LTE network elements.

FIG. 1 illustrates Long Term Evolution (LTE) network management system 100 to process and graphically display Internet Protocol (IP) usage data between LTE network elements 101-103. LTE network management system 100 includes LTE network elements 101-103, routing system 121, and network control system 131. Routing system 121 includes VRF instances 111-113 that correspond to VRF instances included in LTE network elements 101-103. The IP data packets are exchanged using VRF instances 111-113 between LTE network elements 101-103 through routing system 121. Although, three LTE network elements are shown in FIG. 1, it is understood that LTE network management system 100 may include more or fewer LTE network elements. Similary, three VRF instances are shown in FIG. 1, but it is understood that LTE network management system 100 may include more or fewer VRF instances.

Examples of LTE network elements 101-103 include a Mobility Management Entity (MME), PDN Gateway (P-GW), Service Gateway (S-GW), IP Multimedia Subsystem (IMS), Wireless Fidelity Gateway (WIFI GW), 2G/3G Gateway, Home Subscriber Server (HSS), Policy and Charging Rules Function (PCRF), Media Server, eNodeB, and/or other LTE network elements—including combinations thereof.

Examples of routing system 121 include routers, cell site routers, aggregate routers, ingress routers, egress routers, line routers, S-GW routers, P-GW routers, and/or other routers or routing systems—including combinations thereof. Examples of the VRF instances 111-113 include Voice over LTE (VoLTE), prepaid Internet, prepaid voice, video, and push-to-talk.

In operation, routing system 121 exchanges IP data packets between LTE network elements 101-103 using VRF instances 111-113. Routing system 121 generates usage data associating VRF instances 111-113 with amounts of the IP data packets exchanged between LTE network elements 101-103. Network control system 131 receives and processes the usage data to determine the amounts of the IP data packets exchanged between LTE network elements 101-103 for VRF instances 111-113. Network control system 131 graphically displays the amounts of the IP packets exchanged between LTE network elements 101-103 for VRF instances 111-113.

Figure 2:
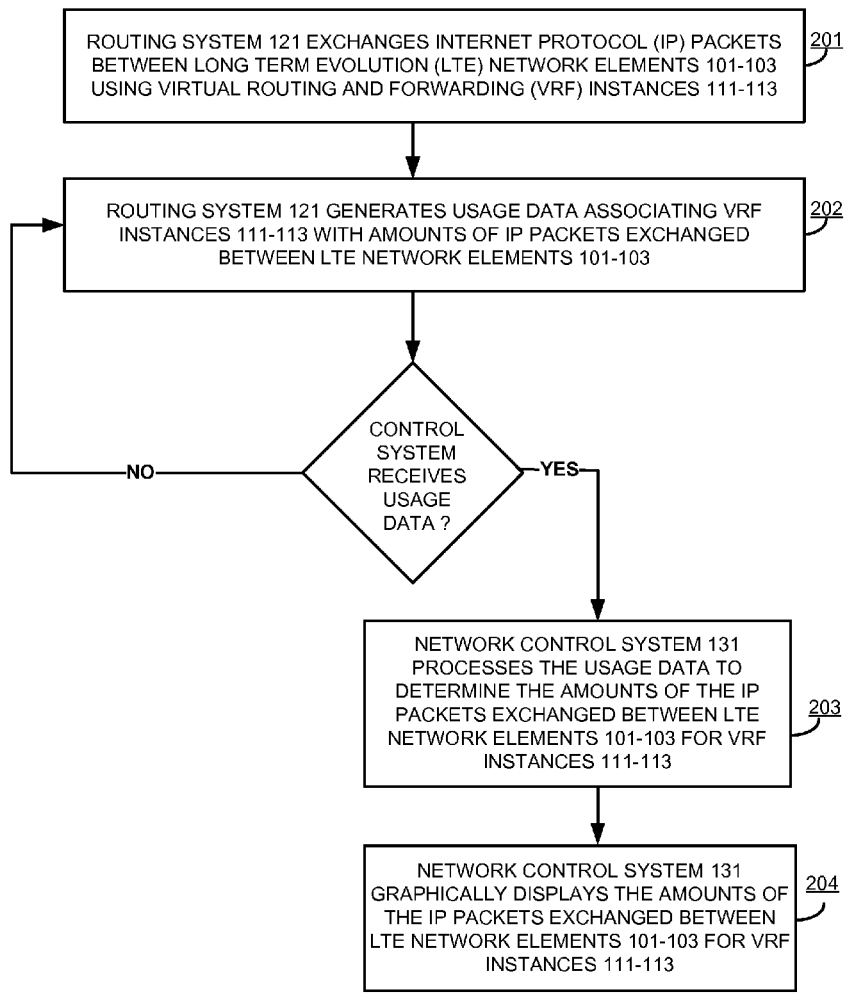
FIG. 2 illustrates the operation of the LTE network management system to process and display IP usage data between LTE network elements.

FIG. 2 illustrates the operation of LTE network management system 100 to process and graphically display IP usage data between LTE network elements 101-103. Routing system 121 exchanges IP data packets between LTE network elements 101-103 using VRF instances 111-113 (201). Routing system 121 generates usage data associating VRF instances 111-113 with amounts of the IP data packets exchanged between LTE network elements 101-103 (202). Network control system 131 processes the usage data to determine the amounts of the IP data packets exchanged between LTE network elements 101-103 for VRF instances 111-113 (203). Network control system 131 graphically displays the amounts of the IP data packets exchanged between LTE network elements 101-103 for VRF instances 111-113 (204).

Figure 3:
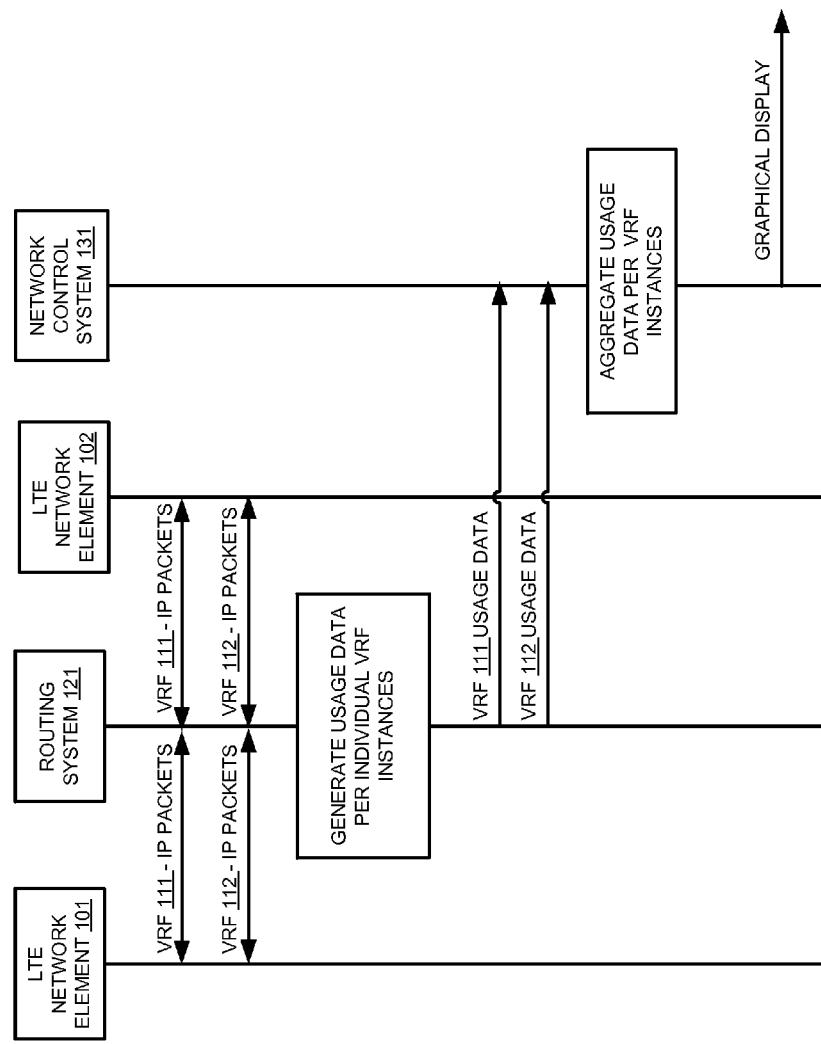
FIG. 3 illustrates the operation of the LTE network management system to process and display IP usage data between LTE network elements.

FIG. 3 illustrates the operation of LTE network management system 100 to process and graphically display usage data between LTE network elements 101-102. For example, a user may request a video media session from a video service such as Netflix. Routing system 121 exchanges IP data packets between LTE network element 101 and LTE network element 102. For example, LTE network element 101 may comprise an eNodeB and LTE network element 102 may comprise an S-GW. Routing system 121 routes the IP data packets comprising the requested video from the S-GW to the eNodeB using VRF instance 111. Although not required, eNodeB may receive another session request. This request could be from the same or a different user. The session request could comprise a VoLTE session request. Routing system 121 routes the IP data packets comprising the VoLTE data packets between the S-GW to the eNodeB using VRF instance 112.

Routing system 121 generates usage data associating VRF instances 111-112 with amounts of the IP data packets exchanged between LTE network element 101 and LTE network element 102. In this example, the amount of IP data transmitted in response to the media video session request between LTE network element 101 and LTE network element 102 is associated with VRF instance 111. The amount of IP data packets transmitted in response to the VoLTE session request between the LTE network element 101 and LTE network element 102 is associated with VRF instance 112.

Routing system 121 transfers the usage data for VRF instances 111-112 for delivery to network control system 131. Network control system 131 receives and processes the usage data for VRF instances 111-112 to determine the amounts of the IP data packets exchanged between LTE network element 101 and LTE network element 102 for VRF instance 111 and VRF instance 112, individually. Network control system 131 graphically displays the amounts of the IP packets exchanged between LTE network element 101 and LTE network element 102 for VRF instance 111 and VRF instance 112.

Figure 4:
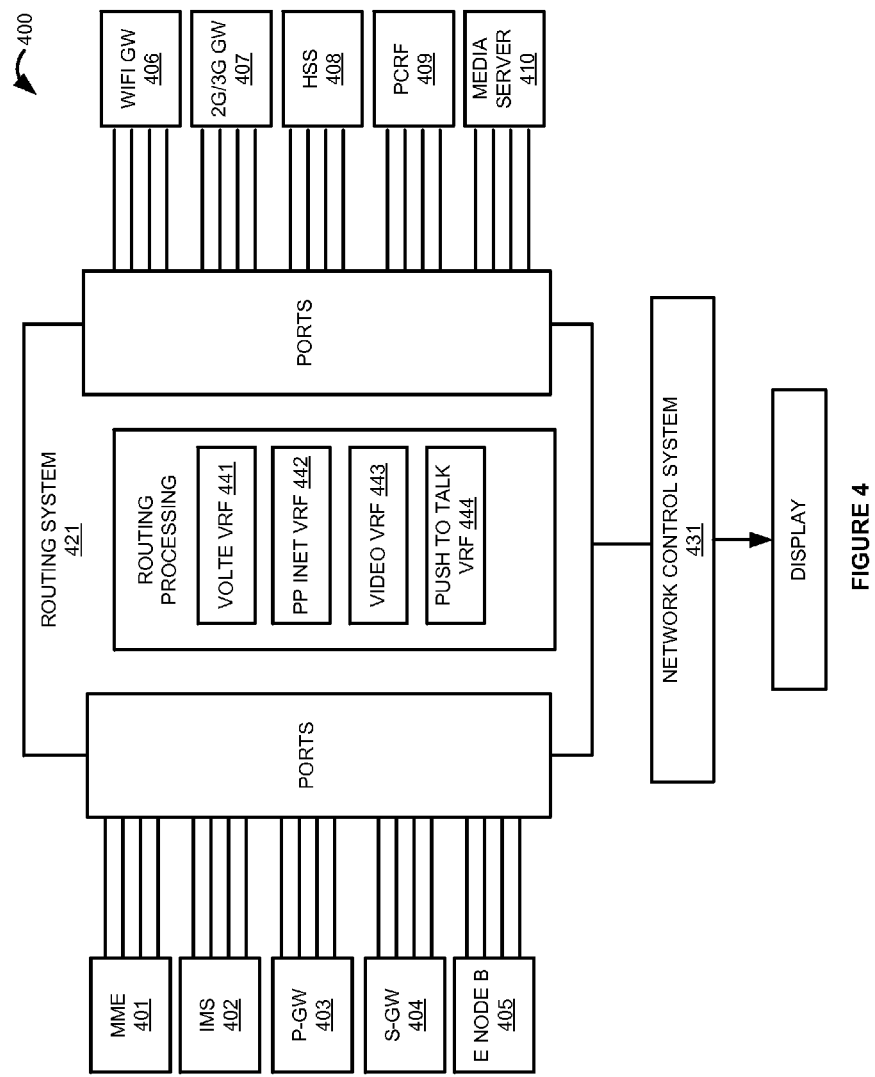
FIG. 4 illustrates a LTE network management system to process and display IP usage data between LTE network elements.

FIG. 4 illustrates LTE network management system 400 to process and graphically display IP usage data between LTE network elements 401-410. LTE network management system 400 is an example of LTE network management system 100, although LTE network management system 100 may use alternative configurations and operations. LTE network management system 400 comprises MME 401, IMS 402, P-GW 403, S-GW 404, eNodeB 405, WIFI-GW 406, 2G/3G-GW 407, HSS 408, PCRF 409, media server 410, routing system 421, and network control system 431. Routing system 421 includes VoLTE VRF instance 441, prepaid Internet (PP INET) VRF instance 442, video VRF 443, and push-to-talk VRF instance 444.

Routing system 421 exchanges IP data packets between LTE network elements 401-410 using VRF instances 441-444. Routing system 421 generates usage data associating VRF instances 441-444 with amounts of the IP data packets exchanged between LTE network elements 401-410. Routing system 421 transfers the usage data for VRF instances 441-444 for delivery to network control system 431. Network control system 431 receives and processes the usage data for VRF instances 441-444 to determine the amounts of the IP data packets exchanged between LTE network elements 401-410 for VRF instances 441-444. Network control system 431 graphically displays the amounts of the IP packets exchanged between LTE network elements 401-410 for each VRF instance 441-444.

Figure 5:
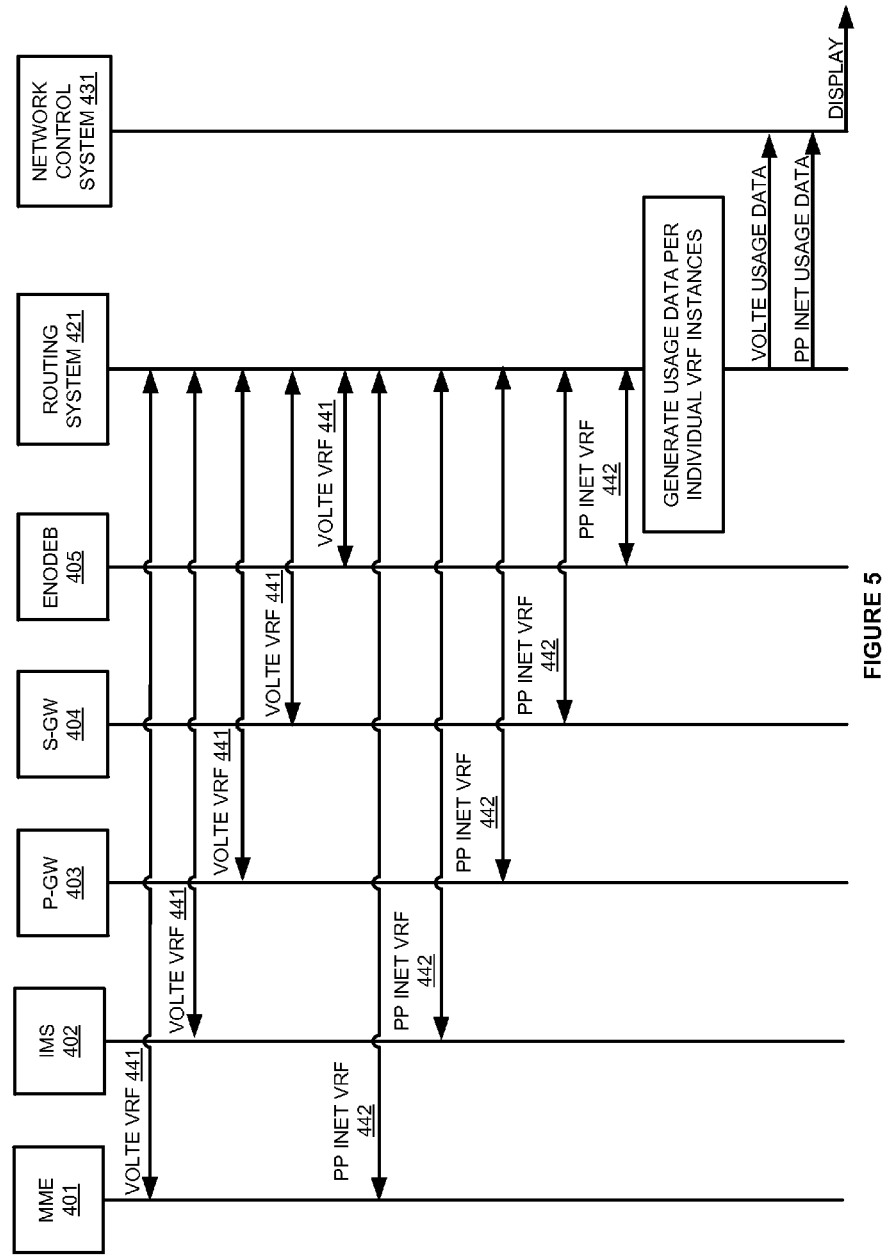
FIG. 5 illustrates the operation of the LTE network management system to process and display IP usage data between LTE network elements.

FIG. 5 illustrates the operation of LTE network management system 400. IP data packets are transmitted between MME 401, IMS 402, P-GW 403, S-GW 404, and eNodeB 405 through routing system 421. In this example, there is a VoLTE session and a prepaid Internet (PP INET) session. The VRF instances are segmented based on the type of service requested. Although, in other examples, the VRF instances may be determined based on other factors such as, device type, user Quality of Service, service plan, data type, and/or other factors—including combinations thereof.

The IP data packets corresponding to the VoLTE session are transmitted using a VoLTE VRF instance 441. The IP data packets corresponding to the prepaid Internet session are transmitted using the PP INET VRF instance 442. Routing system 421 generates usage data associating the VoLTE VRF instance 441 and the PP INET VRF instance 442 with the amount of IP packets exchanged between LTE network elements 401-410.

In this example, routing system 421 generates usage data for the amount of IP packets exchanged between MME 401 and IMS 402 associated with VoLTE VRF instance 441. Routing system 421 also generates usage data for the amount of IP packets exchanged between P-GW 403 and S-GW 404 associated with VoLTE VRF instance 441. Routing system 421 further generates usage data for the amount of IP packets exchanged between S-GW 404 and eNodeB 405 associated with VoLTE VRF instance 441.

Although not required, routing system 421 generates usage data for the amount of IP packets exchanged between MME 401 and IMS 402 associated with PP INET VRF instance 442. Routing system 421 also generates usage data for the amount of IP packets exchanged between P-GW 403 and S-GW 404 associated with PP INET VRF instance 442. Routing system 421 further generates usage data for the amount of IP packets exchanged between S-GW 404 and eNodeB 405 associated with PP INET VRF instance 442.

Routing system 421 transfers the usage data for VoLTE VRF instance 441 and PP INET VRF instance 442 for delivery to network control system 431. Network control system 431 receives and processes the usage data for VoLTE VRF instance 441 and PP INET VRF instance 442 to determine the amounts of the IP data packets exchanged between LTE network elements 401-405 for VRF instances 441-442. Network control system 431 graphically displays the amounts of the IP packets exchanged between LTE network elements 401-405 for VoLTE VRF instance 441 and PP INET VRF instance 442.

Figure 6:
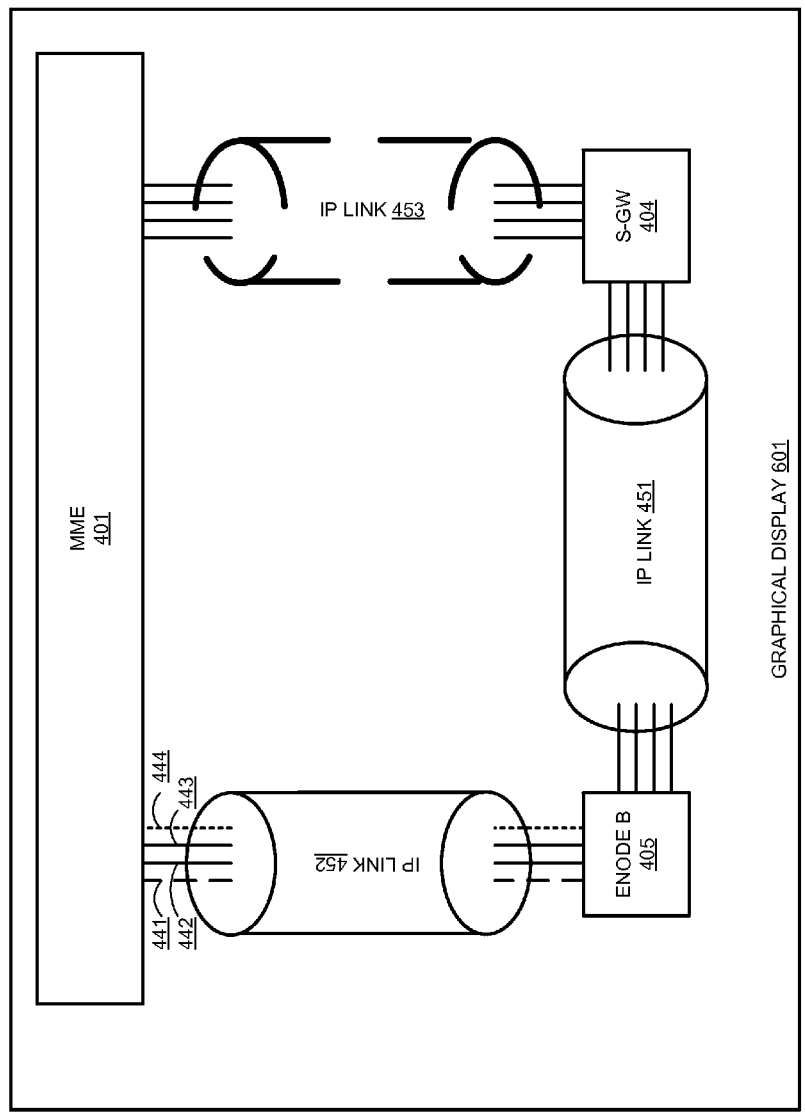
FIG. 6 illustrates an example of a graphical display to process and display IP usage data between LTE network elements.

FIG. 6 illustrates graphical display 601 to display IP usage data between MME 401, S-GW 404, and eNodeB 405 over IP links 451-453. MME 401 exchanges IP data packets with eNodeB 405 over IP link 452 using VRF instances 441-444. MME 401 exchanges IP data packets with S-GW 404 over IP link 453 using VRF instances 441-444. S-GW 404 and eNodeB 405 exchange IP data packets over IP link 451 using VRF instances 441-444. In some examples, graphical display 601 may display other LTE network elements selected by the user. In yet other examples, the graphical display 601 may automatically display any LTE network elements, IP links, and/or VRF instances that need attention.

Graphical display 601 may provide usage data at the "IP link" level or the "VRF instance" level. In this example, IP link 451 and IP link 452 are shown in normal typeface with solid lines to indicate a "NORMAL" status. Factors such as heavy/light traffic, link up/down, or the type of traffic (voice/data) may affect the status of the link. IP link 453 is shown in bold with a dotted line to indicate a "NEEDS ATTENTION" status. For example, IP link 453 may be experiencing heavy traffic and be overloaded. In other examples, IP link 453 may be down. This is an example of the IP link level view.

Graphical display 601 may also display status at the VRF instance level. Graphical display 601 includes network paths or VRF instances 441-444. In this example, VRF instances 442-443 are shown in sold lines to indicate a "NORMAL" status. VRF instance 441 is shown in a dashed line to indicate an "OVERLOADED" status. VRF instance 444 is shown in a dotted line to indicate a "HEAVY TRAFFIC" status. This is an example of the "VRF instance" level display. Graphical display 601 may also include a "Network Element" level display, indicating the amount of traffic exchanged by network element. In other examples, graphical display 601 may indicate any LTE network elements that need attention.

In some examples, graphical display 601 may also include information regarding bandwidth and frequency. For example, graphical display 601 may indicate the total bandwidth of IP links 451-453. The bandwidth information may indicate information such as times of peak/low volume. In other examples, graphical display 601 may include frequency information, such as data packets transmitted per second or some other time increment.

In FIG. 6, graphical display 601 uses different typeface and line types to indicate different statuses. In other examples, graphical display 601 may use different indicators such as colors to indicate the statuses. In addition, graphical display 601 could include the use of tooltips or otherwise display additional information when the cursor is placed over a certain area of the display.

Figure 7:
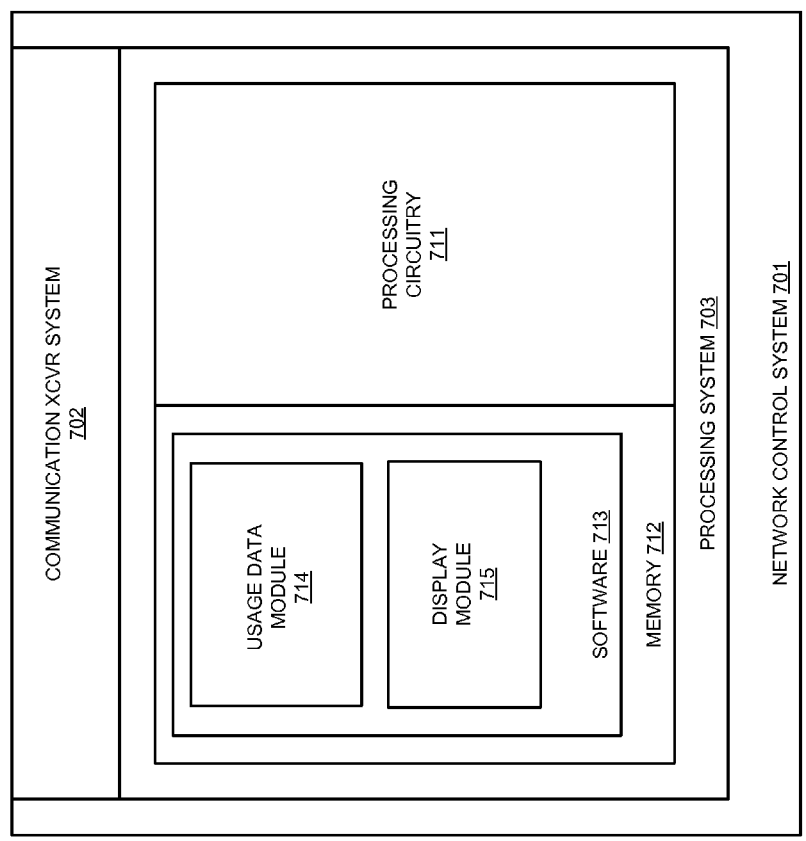
FIG. 7 illustrates a network control system to process and display IP usage data between LTE network elements.

FIG. 7 illustrates network control system 701. Network control system 701 is an example of network control systems 131 and 431, although these systems may use alternative configurations and operations. Network control system 701 comprises communication transceiver system 702 and processing system 703. Processing system 703 includes processing circuitry 711 and memory 712 that stores software 713. Software 713 comprises software modules 714-715.

Communication transceiver system 702 comprises components that communicate over communication links such as network cards, ports, RF transceivers, processing circuitry and software, or some other communication components. Communication transceiver system 702 may be configured to communicate over metallic, wireless, or optical links. Communication transceiver system 702 may be configured to use TDM, IP, Ethernet, optical networking, wireless protocols, communication signaling, or some other communication format—including combinations thereof. Communication transceiver system 702 receives usage data.

Processing circuitry 711 comprises microprocessor and other circuitry that retrieves and executes operating software 713 from memory 712. Processing circuitry 711 may comprise a single device or could be distributed across multiple devices—including devices in different geographic areas. Processing circuitry 711 may be embedded in various types of equipment. Examples of processing circuitry 711 include central processing units, application specific processors, logic devices, and/or any type of computer processing devices—including combinations thereof. Processing circuitry 711 processes the communication session requests to initiate voice and media communication sessions.

Memory 712 comprises a non-transitory computer readable storage medium readable by processing system 703 and capable of storing software 713, such as a disk drive, flash drive, data storage circuitry, or some other hardware memory apparatus—including combinations thereof. Memory 712 can include volatile and non-volatile, removable and non-removable media implemented in any method or technology for storage of information, such as computer readable instructions, data structures, program instances, or other data—including combinations thereof. Memory 712 may comprise a single device or could be distributed across multiple devices—including devices in different geographic areas. Memory 712 may be embedded in various types of equipment. In some examples, a computer apparatus could comprise memory 712 and software 713.

Software 713 comprises computer programs, firmware, or some other form of machine-readable processing instructions. Software 713 may include an operating system, utilities, drivers, network interfaces, applications, or some other type of software. In this example, software 713 comprises usage data module 714 and display module 715, although software 713 could have alternative configurations and operations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to process and display usage data between LTE network elements. In particular, data usage module 714 directs processing system 703 to process the usage data to determine the amounts of the IP packets exchanged between the LTE network elements for each of the individual VRF instances. Display module 715 directs processing system 703 to graphically display the amounts of the IP packets exchanged between the LTE network elements for each of the individual VRF instances.

Figure 8:
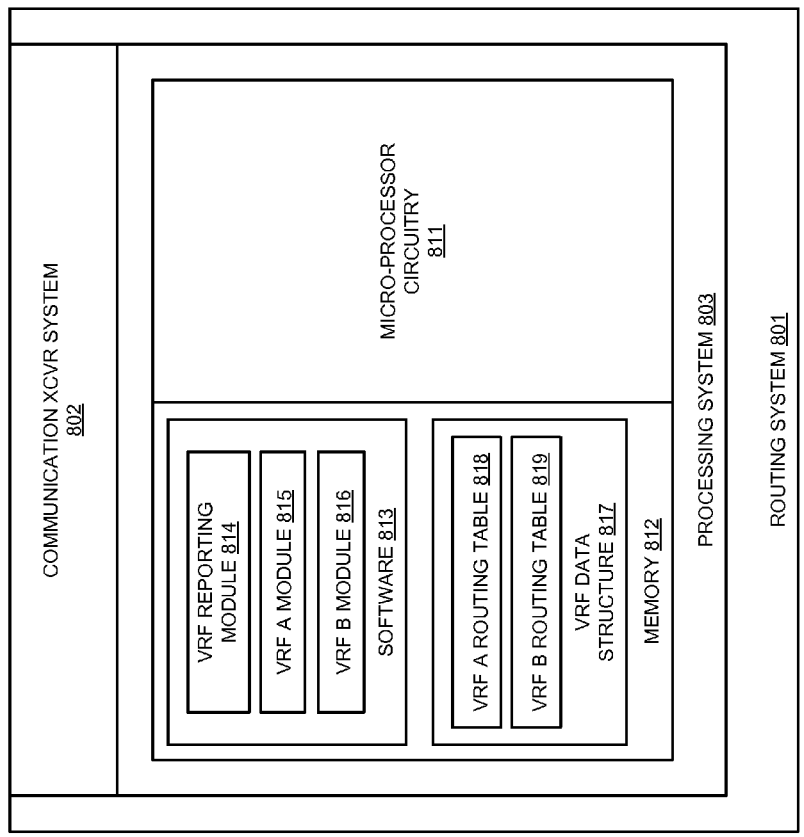
FIG. 8 illustrates a routing system to process and display IP usage data between LTE network elements.

FIG. 8 illustrates routing system 801. Routing system 801 is an example of routing system 121 and 421, although these systems may use alternative configurations and operations. Routing system 801 comprises communication transceiver system 802 and processing system 803. Processing system 803 includes micro-processing circuitry 811 and memory system 812 that stores software 813 and VRF data structure 817. Software includes VRF reporting module 814, VRF A module 815, and VRF B module 816. VRF data structure 817 includes VRF A routing table 818 and VRF B routing table 819. In some examples, VRF data structure 817 may include more or fewer VRF routing tables.

Communication transceiver system 802 comprises components that communicate over communication links such as network cards, ports, RF transceivers, processing circuitry and software, or some other communication components. Communication transceiver system 802 may be configured to communicate over metallic, wireless, or optical links. Communication transceiver system 802 may be configured to use TDM, IP, Ethernet, optical networking, wireless protocols, communication signaling, or some other communication format—including combinations thereof. Communication transceiver system 802 receives IP data packets.

Micro-processor circuitry 811 comprises microprocessor and other circuitry that retrieves and executes operating software 813 from memory system 812. Micro-processor circuitry 811 may comprise a single device or could be distributed across multiple devices—including devices in different geographic areas. Micro-processor circuitry 811 may be embedded in various types of equipment. Examples of micro-processor circuitry 811 include central processing units, application specific processors, logic devices, and/or any type of computer processing devices—including combinations thereof. Micro-processor circuitry 811 processes the IP data packets to route the IP data packets to their destinations.

Memory system 812 comprises a non-transitory computer readable storage medium readable by processing system 803 and capable of storing software 813, such as a disk drive, flash drive, data storage circuitry, or some other hardware memory apparatus—including combinations thereof. Memory system 812 can include volatile and non-volatile, removable and non-removable media implemented in any method or technology for storage of information, such as computer readable instructions, data structures, program modules, or other data—including combinations thereof. Memory system 812 may comprise a single device or could be distributed across multiple devices—including devices in different geographic areas. Memory system 812 may be embedded in various types of equipment. In some examples, a computer apparatus could comprise memory system 812 and software 813.

Software 813 comprises computer programs, firmware, or some other form of machine-readable processing instructions. Software 813 may include an operating system, utilities, drivers, network interfaces, applications, or some other type of software. Software 813 may be implemented in program instructions and may be executed by processing system 803. Software 813 may include additional processes, programs, or components, such as operating system software, database software, or application software—including combinations thereof. Software 813 may also comprise firmware or some other form of machine-readable processing instructions executable by processing system 803.

When executed, software 813 directs processing system 803 to operate as described herein to process and display usage data between LTE network elements. In particular, VRF reporting module 814 directs processing system 803 to monitor and transmit the usage data to the network control system. VRF A module 815 and VRF B module 816 direct processing system 803 to use VRF A routing table 818 and VRF B routing table 819 to route the IP data packets to their destinations.

Referring back to FIG. 1, LTE network elements 101-103 comprise RF communication circuitry and antennas. The RF communication circuitry typically includes an amplifier, filter, RF modulator, and signal processing circuitry. LTE network elements 101-103 may also comprise routers, servers, memory devices, software, processing circuitry, cabling, power supplies, network communication interfaces, structural supports, or some other communication apparatuses. LTE network elements 101-103 could be a base station, Internet access node, telephony service node, eNodeB, wireless data access point, MME, P-GW, S-GW, IMS, WIFI GW, 2G/3G GW, HSS, PCRF, Media Server, and/or other LTE network elements—including combinations thereof.

Routing system 121 comprises a computer system and communication interface. Routing system 121 may also include other components such as a router, server, data storage system, and power supply. Routing system 121 may reside in a single device or may be distributed across multiple devices. Network control system 131 comprises a computer system and communication interface. Network control system 131 may also include other components such as a router, server, data storage system, and power supply. Network control system 131 may reside in a single device or may be distributed across multiple devices.

LTE network management system 100 may include communication links that use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. These communication links could be direct links or may include intermediate networks, systems, or devices.

LTE network management system 100 may also comprise wireless communication links that use the air or space as the transport media. The wireless communication links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. LTE network management system 100 may also comprise switches, wireless access nodes, Internet routers, network gateways, application servers, computer systems, communication links, or some other type of communication equipment—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) network management system, comprising:
   in a routing system, exchanging Internet Protocol (IP) packets between a pair of LTE network elements using a plurality of Virtual Routing and Forwarding (VRF) modules in each of the pair of LTE network elements;
   in the routing system, generating usage data associating individual ones of the plurality of VRF modules in a first LTE network element and individual ones of the plurality of VRF modules in a second LTE network element with amounts of the IP packets exchanged between the pair of LTE network elements; and
   in a network control system, processing the usage data to graphically display the amounts of the IP packets exchanged between the pair of the LTE network elements for each of the individual VRF modules.

2. The method of claim 1 wherein the pair of the LTE network elements comprise a Mobility Management Entity (MME) and a PDN Gateway (P-GW).

3. The method of claim 1 wherein the pair of the LTE network elements comprise a PDN Gateway (P-GW) and an IP Multimedia Subsystem (IMS).

4. The method of claim 1 wherein the pair of the LTE network elements comprise a Mobility Management Entity (MME) and an eNodeB.

5. The method of claim 1 wherein the pair of the LTE network elements comprise a Service Gateway (S-GW) and an eNodeB.

6. The method of claim 1 wherein the pair of the LTE network elements comprise a Service Gateway (S-GW) and a PDN Gateway (P-GW).

7. The method of claim 1 wherein one of the VRF modules comprises a push-to-talk module.

8. The method of claim 1 wherein one of the VRF modules comprises a Voice over LTE (VoLTE) module.

9. The method of claim 1 wherein one of the VRF modules comprises a pre-paid Internet module.

10. The method of claim 1 wherein one of the VRF modules comprises a video module.

11. A Long Term Evolution (LTE) network management system, comprising:
  a routing system configured to exchange Internet Protocol (IP) packets between a pair of LTE network elements using a plurality of Virtual Routing and Forwarding (VRF) modules in each of the pair of LTE network elements;
  the routing system configured to generate usage data associating individual ones of the plurality of VRF modules in a first LTE network element and individual ones of the plurality of VRF modules in a second LTE network element with amounts of the IP packets exchanged between the pair of LTE network elements; and
  a network control system configured to process the usage data to graphically display the amounts of the IP packets exchanged between the pair of the LTE network elements for each of the individual VRF modules.

12. The LTE network management system of claim 11 wherein the pair of the LTE network elements comprise a Mobility Management Entity (MME) and a PDN Gateway (P-GW).

13. The LTE network management system of claim 11 wherein the pair of the LTE network elements comprise a PDN Gateway (P-GW) and an IP Multimedia Subsystem (IMS).

14. The LTE network management system of claim 11 wherein the pair of the LTE network elements comprise a Mobility Management Entity (MME) and an eNodeB.

15. The LTE network management system of claim 11 wherein the pair of the LTE network elements comprise a Service Gateway (S-GW) and an eNodeB.

16. The LTE network management system of claim 11 wherein the pair of the LTE network elements comprise a Service Gateway (S-GW) and a PDN Gateway (P-GW).

17. The LTE network management system of claim 11 wherein one of the VRF modules comprises a push-to-talk module.

18. The LTE network management system of claim 11 wherein one of the VRF modules comprises a Voice over LTE (VoLTE) module.

19. The LTE network management system of claim 11 wherein one of the VRF modules comprises a pre-paid Internet module.

20. The LTE network management system of claim 11 wherein one of the VRF modules comprises a video module.

* * * * *